United States Patent
Brinkman et al.

(10) Patent No.: US 7,610,548 B1
(45) Date of Patent: Oct. 27, 2009

(54) METHOD AND APPARATUS FOR APPLYING LOCALE BEHAVIORS TO REGIONS OF A FORM

(75) Inventors: John P. Brinkman, Ottawa (CA); Gavin F. Mckenzie, Ottawa (CA); Mike P. Tardif, Ottawa (CA)

(73) Assignee: Adobe Systems Inc., San Jose, CA (US)

(*) Notice: Subject to any disclaimer, the term of this patent is extended or adjusted under 35 U.S.C. 154(b) by 789 days.

(21) Appl. No.: 11/250,045

(22) Filed: Oct. 13, 2005

(51) Int. Cl.
*G06F 15/00* (2006.01)
*G06F 7/00* (2006.01)
*G06Q 30/00* (2006.01)

(52) U.S. Cl. ............... 715/221; 715/234; 715/236; 715/703; 715/760; 707/103 R; 705/26

(58) Field of Classification Search ............ 715/200, 715/204, 205, 221–226, 234–236, 239, 249, 715/253, 255, 256, 271, 273, 760, 780, 781, 715/703, 861; 705/26, 27; 707/1, 100, 101, 707/102, 103 R, 103 Y, 203
See application file for complete search history.

(56) References Cited

U.S. PATENT DOCUMENTS 7,013,289 B2 * 3/2006 Horn et al. ............. 705/26
7,353,397 B1 * 4/2008 Herbach .................. 713/176
2002/0194219 A1 * 12/2002 Bradley et al. ........... 707/506
2004/0199876 A1 * 10/2004 Ethier et al. ............. 715/523
2006/0136422 A1 * 6/2006 Matveief et al. ......... 707/10

OTHER PUBLICATIONS

XFA Technology, "JetForm XML Forms Architecture XFA.COM", Nov. 22, 1999, 11 pages.*
Adobe Systems Inc., "XFA Specification Version 2.2_draft", pp. 1-500.*
Adobe Systems Inc., "XFA Specification Version 2.2_draft", pp. 501-744.*
Gavin F. McKenzie (editor)), "XFA-Template Version 1.0", World Wide Web Consortium, pp. 1-196, Jun. 14, 1999.*

* cited by examiner

*Primary Examiner*—Laurie Ries
*Assistant Examiner*—MaiKhanh Nguyen
(74) *Attorney, Agent, or Firm*—Chapin IP Law, LLC

(57) ABSTRACT

A method, apparatus and computer program product for identifying a form, the form having a form template and including at least one object. A locale property definition is assigned for the at least one object of the form. The locale property definition is stored with the form template. The form is rendered, wherein the at least one object of the form is rendered in accordance with the locale property definition for the at least one object.

18 Claims, 4 Drawing Sheets

PURCHASE ORDER

Vendor: ABC Company

Address:
1 Little Road
Anywhere, Ma 01754
United States

Ship to: James Deer

Address:
4 Orchard Street
Aldwych, London W1h0JS
United Kingdom

Date: 4 July 2005

| Item: | Quantity: | Unit Price: | Amount: |
|---|---|---|---|
| 1 pound chocolates | 1 | £13 | £13 |
| Jar of Cashews | 3 | £10 | £30 |

Total: £43

Submit

*Figure 2*

METHOD AND APPARATUS FOR APPLYING LOCALE BEHAVIORS TO REGIONS OF A FORM

BACKGROUND

Forms are well known to most people, and area a part of everyday life. Most people are consumers of forms, rather than producers or designers of forms. In order for a software product to utilize forms, someone first had to work towards the act of developing the form. It is important to distinguish between the 'form' that the creator designs, and the 'form' that a consumer handles—they both represent the same form, but at two very different stages in the form's life cycle.

To an end user (form consumer), a form represents something to be filled out, by entering data into the white spaces. There is little or no distinction between a blank form and a filled form, other than the presence of data. In fact, the absence of data in a particular data entry element can be as meaningful as the presence of data.

In contrast, a form designer views a form as a vehicle for capturing, rendering and manipulating data. As such, the designer is concerned with issues of layout, interaction and processing. A template is a specification of capture, rendering and manipulation rules that apply to form instances created from that template.

A form is the result of combining a form template with data. This includes the initial case of a blank form, which is a form template with an empty data set. An end-user (form consumer) interacts with a form for several reasons. Among these reasons are to fill the form interactively, to view a form which was filled by another user, to print the form or to submit the form to another process, such as a workflow process.

When selecting a form to be filled interactively, the user perceives that they are selecting a blank form. The user is performing an operation similar to starting a new document in a word processor, by first selecting a template. The user selects this template that the form-filling application uses to construct a form, which at first appears blank.

The user may fill out the form, and save the data content to a file or a database. It is important to note that the data was saved, not the form (and not the form template). Some time later, the user may select the same template, a form is displayed, then proceeds to reload the previously produced data into the form. Alternately, the user may select the previously saved data, and the template is automatically retrieved by some association stored between the form and data. There are also cases where the entire state of the form (data and template) need to be saved together A form is composed of objects that the user perceives as the form content, such as the graphical and textual content that is part of the static form design, and the content present in the fields typically provided by a user. These content objects are arranged within the template coordinate space and presented to the user by enclosing the content within container objects such as draw, field, area, or subform container objects.

As mentioned above, a template represents the potential for a form. A template is a non-geographical grouping of objects. The template represents the form design as a whole, enclosing all of the objects and intelligence of the form. A template is a collection of related subforms and processing rules. A form designer interacts with the form template for several reasons. These reasons include designing a new template from scratch, designing a new template based upon one or more existing templates or modifying an existing template.

Form content refers to any piece of data that may appear on a form. Content includes, but is not necessarily limited to, interactive data (enclosed in field elements), static data (enclosed in draw elements), textual data (both plain and rich), and graphical data (e.g., lines, boxes, images and the like).

The end user, while aware of a form's interactive content, generally doesn't make a distinction between that content and the field that houses it. However, the distinction is important to the form designer. Content elements tend to be concerned with data related issues (e.g., data type and limitations), while field elements are concerned with presentation and interaction.

A container or container object refers to an element that houses a piece of content. The container is concerned with all form-related aspects of dealing with its content. These include rendering, interactions with the user interface, data entry sequencing, calculations and other interactions with other containers/content.

A field is a container element that houses one piece of dynamic content of a form. As instances of forms are created from a common template, the static content is generally the same across those instances. However, the dynamic content is very likely to change from instance to instance.

The end user filling out a form effects change to dynamic content. Often, the user interacts with a field via data entry (typing). However, every interactive element on a form is a field. Accordingly, pushbuttons, check-boxes, and even some images are also fields. The end user is not the only source of change to dynamic content. Applications, database input, dynamic calculations and many other sources can also change this content.

The content within a form template is presented to the user by enclosing the content within container objects. Containers determine the layout and formatting of the form content and include the field element described above, as well as the draw, area, subform and exclusion group elements.

Forms invariably contain static content. This content, often referred to as boilerplate, typically provides context and assistance for consumers of the form. A draw element encloses each piece of static content. A user cannot directly interact with a draw object. The draw element content is not limited to text. For example, a line element is legitimate content for a draw element.

A field object is the workhorse of a template, and represents a data-entry region. A user is typically expected to interact with the fields by providing data input. Fields provide a pluggable user interface and support for a broad variety of content data-typing.

Every container has the notion of a value. This container value can be used in calculations and may be persisted when the form's data is saved. For draw and field containers, the value is the container's content. For containers of containers (area, exclusion group and subform), the value of the container is the value of one of the child containers. The rules for determining which child container's value to use are described with each container element. It should be noted that the container value is more than a read-only property. There are operations that can set a container's value, even if the container is a container of other containers.

Content is available in a variety of types. These types include arc, boolean, date, datetime, decimal, exdata, float, image, integer, line, rectangle, text, and time. Other content types may also be used.

It should be recognized that not all types of content are appropriate everywhere on a form. Specifically, while it may be possible for all of the content types to be rendered on the form, it is likely that user will have a restricted set of content types that may be used for data input into the form.

Draw content refers to the set of possible content elements that can be enclosed inside a draw object, and this corresponds to the entire set of content types. Thus, while practically all content objects can be presented or 'drawn', a form filling application may not be capable of providing a method for the user to input all types of content objects.

For example, a typical form will have textual content presented on the form itself (providing field labels and instructional text to the user) and permit the user to input textual content into the fields of the form. Another draw content type presented on forms includes rectangles and lines that provide the graphical composition, but the user would not typically have the ability to input a line or a rectangle into a field on the form.

Field content is the subset of the available content types that a user can input with a form filling application and may be enclosed inside a field object. The majority of form field content is textual or numeric data.

A subset of content objects may be specified as the minimum that a form filling application should permit within a field container. This subset may include boolean, date, datetime, decimal, exdata, float, image, integer, text, and time.

Null values have a traditional significance with databases, where it is important to have a means to explicitly signify the lack of a value. A database table column may be permitted to hold null values, and this is used in the screen-based data entry forms and subsequent queries as a means of identifying or excluding the table columns that have no value. It is common to construct a query that selects database table rows where one or more criteria are not null.

This requirement and subsequent usage of null values also applies to electronic forms, where it is often important to distinguish fields that have no value, and exclude these same fields from calculations. For instance, given a form that accepts up to ten numbers and calculates the average, the form has ten entry fields and one calculated displayed average field. The user is not required to provide ten numbers; the user can provide as few or many numbers up to a maximum of ten. The correct calculation of the average is dependent upon excluding the empty fields from the average. Were all ten fields included in the average calculation, including the empty fields, the average could be skewed by accidentally considering empty fields to have a value of zero. In this example it is important that there be a straightforward way for distinguishing between null (empty) fields, and fields where the user has explicitly typed a value including a possible zero value.

Content elements are capable of holding a value of null. This is, by default, the value of an empty content element. Content elements also have an attribute that permits this behavior to be changed. As previously described, empty content elements are null by default—adjusting this attribute will require that null values be explicitly specified with a <Null/> element.

Note that with text content, there is a distinction between null content and empty content. In general, processing applications deal with null content in ways that are intuitive to the end user. For example, a text field that contains null content and a text field that contains an empty string will often be treated as being identical, unless the form designer explicitly wants to take advantage of null content.

When developing internationalized applications, a locale is the standard term used to identify a particular geopolitical region. A locale defines (but is not limited to) the format of dates, times, numeric and currency punctuation that are culturally relevant to a specific nation. A properly internationalized application will always rely on the locale to supply it with the format of dates, and times. This way, users operating in their locale will be presented with the date and time formats they are accustomed to.

A locale is identified by a language code and/or a country code. Usually, both elements of a locale are important. For example, the names of weekdays and months in English, in Canada and in the UK are formatted identically, but dates are formatted differently. So, specifying an English language locale would not suffice. Conversely, specifying only a country as the locale may not suffice either—for example, Canada, has different date formats for English and French.

SUMMARY

Conventional mechanisms such as those explained above suffer from a variety of deficiencies. One such deficiency associated with conventional forms is their dependence on Operating System (OS) or applications-defined locale definitions. Another deficiency associated with conventional forms is that they apply locale-sensitive processing to only a subset of document operations. Further, a locale is defined at form authoring with a fixed form field picture format.

Typically, forms are defined to participate in a single locale. That locale is usually specified as part of the form design or is inherited from the ambient environment. Further still, form clients do not allow locale to change at runtime, let alone change the locale for a subset of the form. They also do not use locale to control all of a code page; a writing style (left to right or right to left); a default date/time format; make picture formats aware of locale and then set radix, thousands separator, and currency symbol appropriately; edit formats for date/time/numeric data; and reading/writing data (converting to/from canonical form). In order to ensure document consistency over time and operating system versions, locale definitions should be stored with the document.

Embodiments of the invention significantly overcome such deficiencies and provide mechanisms and techniques that apply locale behaviors to a form.

In a particular embodiment of a method of applying locale behaviors to a form, the method includes identifying a form, the form having a form template and including at least one object. The method further includes assigning a locale property definition for the at least one object of the form. The method also includes storing the locale property definition with the form template. The method additionally includes rendering the form, wherein the at least one object of the form is rendered in accordance with the locale property definition for the at least one object.

Other embodiments include a computer readable medium having computer readable code thereon for applying locale behaviors to a form. The medium includes instructions for identifying a form, the form having a form template and including at least one object. The medium further includes instructions for assigning a locale property definition for at least one object of the form and instructions for storing the locale property definition with the form template. The medium additionally includes instructions for rendering the form, wherein the at least one object at the form is rendered in accordance with the locale property definition for the at least one object.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that applies locale behaviors to a form as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations applying locale behaviors to a form as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 illustrates an example form using a second locale;

DETAILED DESCRIPTION

Figure 1:
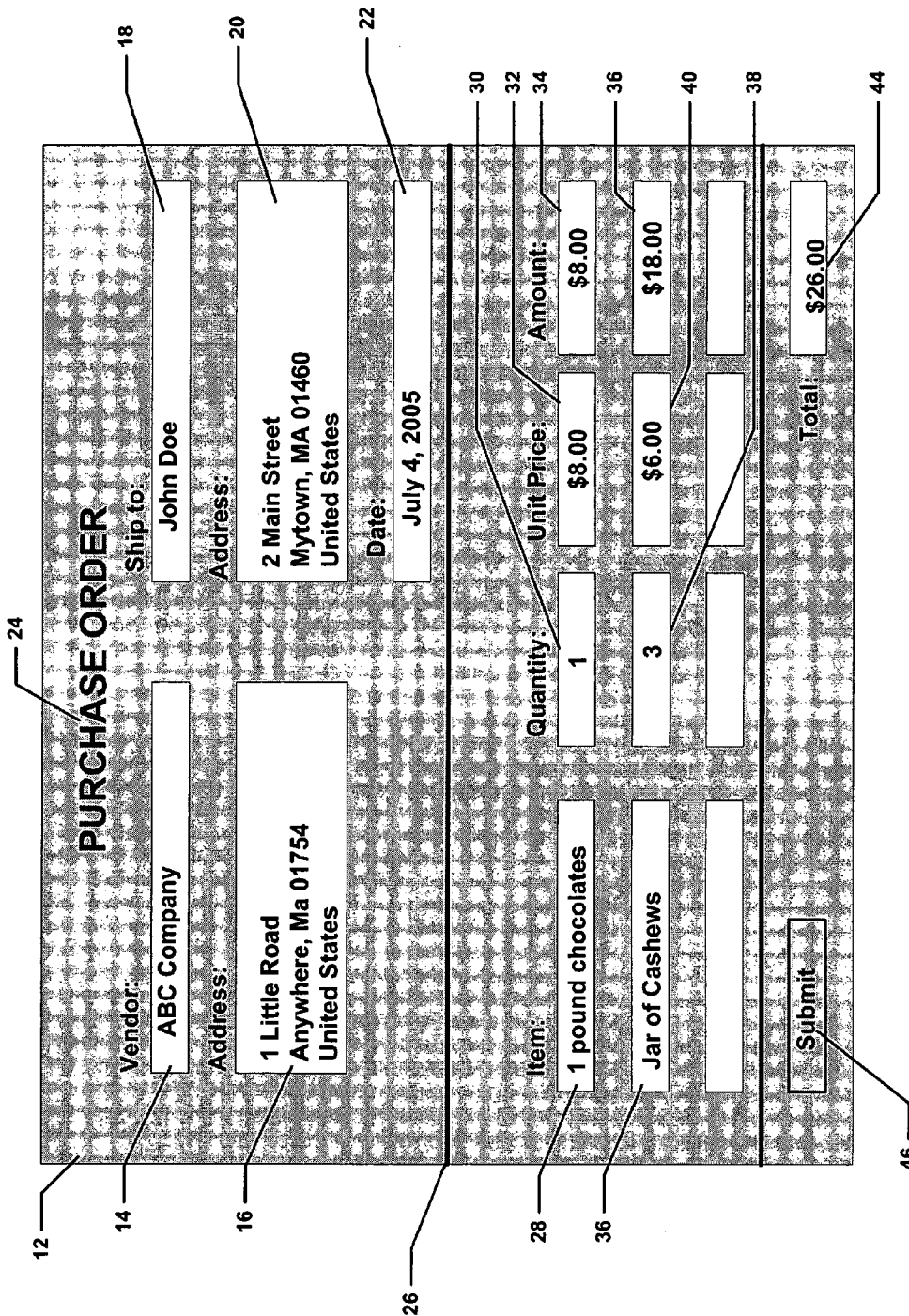
FIG. 1 illustrates an example form using a first locale.

Anyone that has used a traditional paper form as a consumer has a very clear impression of what a form is. There is little thought given to the distinction between a blank form, and a form which has been completed. On the other hand, a form designer is concerned only with the creation of blank forms.

A method that gives the form author the flexibility of defining, storing, referencing and responding to locale definitions in a form and for embracing locale-related functionality in a form is presented. In order to provide consistent form behavior and rendering, locale definitions should remain consistent across operating systems/API versions and time. Therefore, the locale definition should be stored with the form template to ensure a consistent representation across operating systems over time. Locale definitions may be customized for specific customer need. A form may reference a locale for the entire form or for regions (subforms or fields) of the form. The locale may be altered at runtime. Form behaviors respond to the current locale, the behaviors including code page selection for rendering, writing style (left to right or right to left), default date/time format, picture formats, edit formats for date/time/numeric data (e.g. a date field may display a date in a long format, but when the user tabs in to edit, the format for editing could be a locale-sensitive short date format) and locale definitions used to convert user data to/from canonical form.

Form developers typically utilize forms architecture for creating forms. One such architecture is known as the XML Forms Architecture (XFA), which provides for the specific requirements of electronic forms and the applications that use them. XFA addresses the needs of organizations to securely capture, present, move, process, output and print information associated with electronic forms. XFA has an XML grammar for defining a locale. This XML definition is stored inside the XDP or PDF. At form design time, locales are defined according to international standards, however the markup that defines the locale may be customized or new locales added. The XFA markup references locale definitions by name using a locale attribute on both field and subform, e.g. <fieldname="amount" locale="fr_FR"/>.

The script object model allows the locale to be changed at runtime e.g. amount.locale="en_US" locale is an inherited attribute. If a field doesn't specify a locale, the locale of the parent subform is used. If the parent doesn't specify a locale, the parents' parent is checked and so forth. If no locale is specified, a default to the ambient locale is used.

Picture formats are locale sensitive: e.g. a picture format of $9,999.99 will adopt the currency symbol (and placement), thousands separator, and radix symbol appropriate to the locale. Default date formats are locale sensitive, e.g. a field might display a date in a long format "Thursday Oct. 28, 2004" but when editing the value would allow the user to type in a date in the short date format appropriate to their locale e.g. in US: MM/DD/YYYY in Canada: DD/MM/YYYY When rendering textual data, a form field should select a codepage and writing style that is appropriate for the locale. The combination of locale and picture format can be used to translate user data to a canonical form for processing, e.g. if the data contains the string '1.234,56' in a German locale, it can be bound to a form field as "1234.56" and thus participate in numeric calculations.

Common paper forms often contain sections and subsections that are easily distinguished from one another. The form is really a collection of these sections and subsections, each of which XFA refers to as a subform. One can think of a subform as a sort of interactive area. Some of the features offered by Subforms include the ability to control user interaction through use of the access attribute, the ability to control form filling order through sequencing specifications, the management of scope of object names in scripting operations, and the validation of the content of the subform as a whole.

A subform provides the level of granularity that a form object library would use. A form object library is a tool used by form designers to store commonly used groupings of form container objects, for example, company letterhead.

Objects may be grouped together in a form. An Exclusion Group is a non-geographical grouping of objects. By grouping the objects together, they exhibit mutual exclusivity semantics commonly associated within radio-buttons or ballot/check-boxes; only one of the objects is permitted to have a value or be selected by the user.

In general, every application operates in an environment where a locale is present; this is the ambient locale. In the rare circumstance where the application is operating on a system or within an environment where a locale is not present, the ambient locale will default to English United States (en-US); this is the default locale. An ambient locale is the locale defined outside of the form in the hosting application environment or hosting computer system. In other words, it is the locale present "above" (outside of) the root object in the form object hierarchy. So, a form object that that states it wished to use the ambient locale is stating that it wishes to ignore any locales that may be specified in any ancestral (enclosing) form object and instead wishes to employ the locale present just outside the context of the form as provided by the hosting application or computer system.

A form may contain one or more areas. An area of a form is a grouping of form container objects. The grouping itself is not visible, although the objects themselves may be visible. For example, in FIG. 1, a form 12 is shown. The form 12 contains several fields 14, 16, 18, 20, 22 etc. The form 12 also contains draw elements 24 and 26. The vendor name and address data entry elements, along with the corresponding static text elements might be grouped into an area. Areas provide the designer with a means of organizing elements on a form, so that they may be moved or manipulated as a whole. An area is itself a container. The top part of the form containing the vendor field 14, vendor address field 16, ship to field 18, ship to address field 20 and date field 22, along with the Purchase Order draw element may comprise a header area of the form In FIG. 1, form 12 is shown wherein the form template has been rendered and data has been entered into the fields of the form. As described above, the vendor field 14 has been filled out to indicate the name of the vendor, and the vendor address field 16 has been filled out to indicate the address of the vendor. The Ship to field 18 has been filled out to indicate the party receiving the order and the address for that party has been entered into field 20. The date has also been provided in field 22. All this information has been entered by the user and presented in a locale. Since the user is residing in the Unites State, the U.S. locale has been selected in this example, and the date is presented in a format consistent with the location of the user.

Additional data fields of the form have been filled out. For example data field 28 has been filled out to indicate the item being purchased. In data field 30 the quantity of the item in data field 28 is indicated. The unit price for the item is presented in data field 32 and the amount is presented in data field 34. Similarly, a second item has been entered in data field 36, a respective quantity in data field 38 and a unit price in data field 40. The total amount for this item is calculated and presented in data field 36. Also presented is a purchase order total 44. The user clicks the submit button 44 to place the order. The data in fields 34, 36 and 44 are presented in accordance with the Unites States locale.

The same form is shown in FIG. 2, however this form is presented in accordance with a different locale for certain fields of the form. The vendor field 14 has been filled out to indicate the name of the vendor, and the vendor address field 16 has been filled out to indicate the address of the vendor. This is the same as the form of FIG. 1. The Ship to field 18 however has been filled out to indicate the party receiving the order and the address for that party has been entered into field 20. The date has also been provided in field 22. All this information has been entered by the user and presented in accordance with a locale. In this instance the United Kingdom (U.K.) locale has been selected. Accordingly, the date in field 54 is presented in a format consistent with the location of the user, which is different then how the date in field 22 was presented in FIG. 1.

Additional data fields have been filled out in this form. For example date field 28 has been filled out to indicate the item being purchased. In data field 30 the quantity of the item in data field 28 is indicated. The unit price for the item is presented in data field 56 and the amount is presented in date field 58. Note that fields 56 and 58 data is presented in a format consistent with a U.K. locale. Similarly, a second item has been entered in data field 36, a respective quantity in data field 38 and a unit price in data field 60. The total amount for this item is calculated and presented in data field 62. Also presented is a purchase order total 66. The data in fields 58, 56, 58, 60 , 62 and 66 are presented in accordance with the United Kingdom locale. By way of the above, the same form is presented in two different formats related to the locale of the form.

Figure 3:
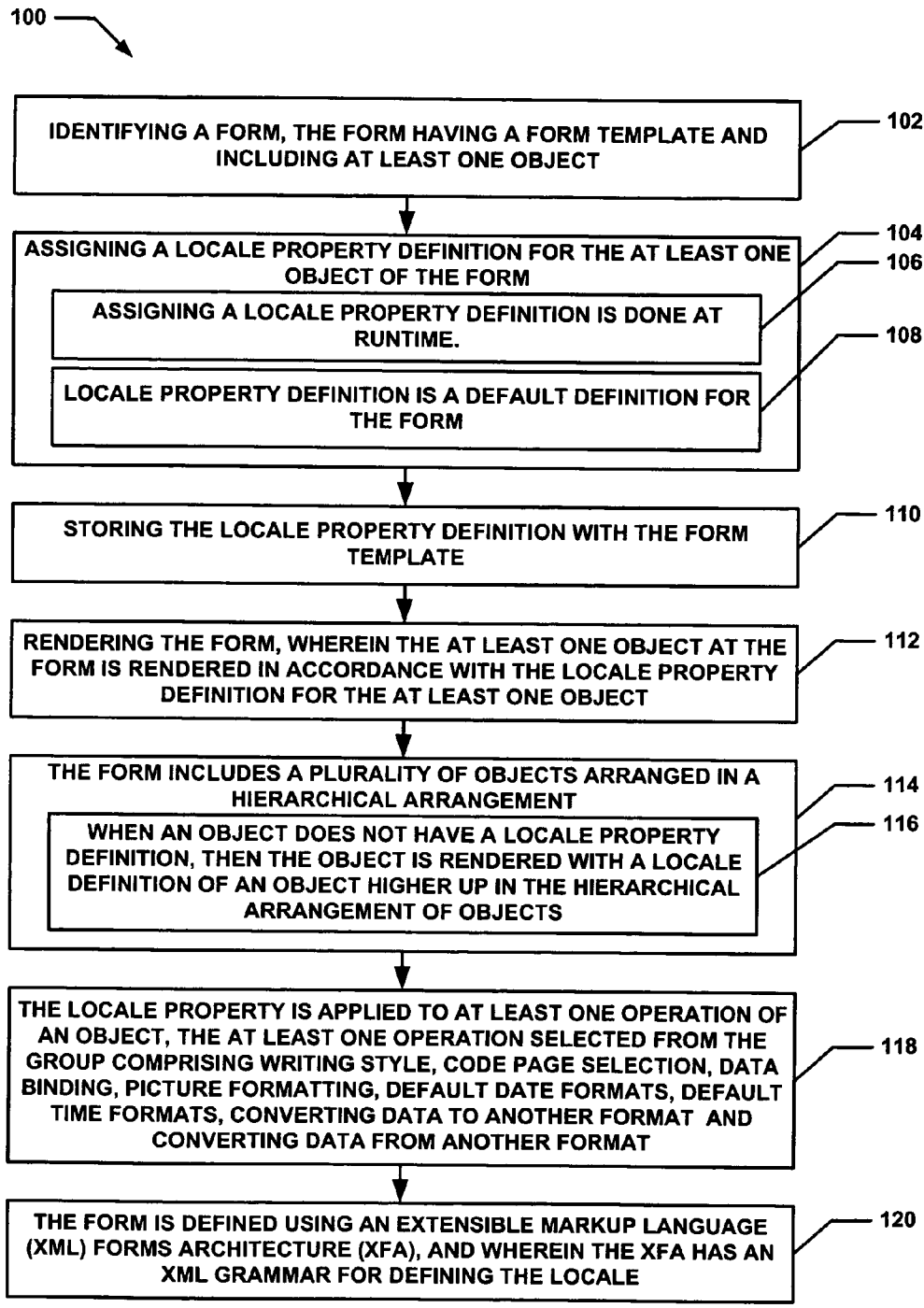
FIG. 3 is a flow diagram for a method that applies locale behaviors to a form in accordance with embodiments of the invention.

A flow chart of the presently disclosed method is depicted in FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 3, a method 100 of applying locale behaviors to a form is presented. The method begins with processing block 102 wherein a form is identified. The form may include a form template and at least one object.

In processing block 104 a locale property definition is assigned for the at least one object of the form. The assigning of a locale property definition may be done at runtime, as recited in processing block 106. As stated in processing block 108, the locale property definition is a default definition for the form.

In processing block 110, the locale property definition is stored with the form template. In order to provide consistent form behavior and rendering, locale definitions should preferably consistent across operating systems/API versions and time. Therefore, the locale definition should be stored with the form template to ensure a consistent representation across operating systems over time.

As stated in processing block 112, the form is rendered. At least one object of the form is rendered in accordance with the locale property definition for the at least one object. Different objects may be rendered in accordance with different locales.

Referring now to processing block 114, the form may includes a plurality of objects arranged in a hierarchical arrangement. As recited in processing block 116, when an object does not have a locale property definition, then the object is rendered with a locale definition of an object higher up in the hierarchical arrangement of objects. When no locale definition is defined, then a default locale definition is used.

In processing block 118 the locale property is applied to at least one operation of an object. The at least one operation may be selected from the group comprising writing style, code page selection, data binding, picture formatting, default date formats, default time formats, converting data to another format and converting data from another format.

As recited in processing block 120, the form is defined using an eXtensible Markup Language (XML) Forms Architecture (XFA). The XFA has an XML grammar for defining the locale.

Figure 4:
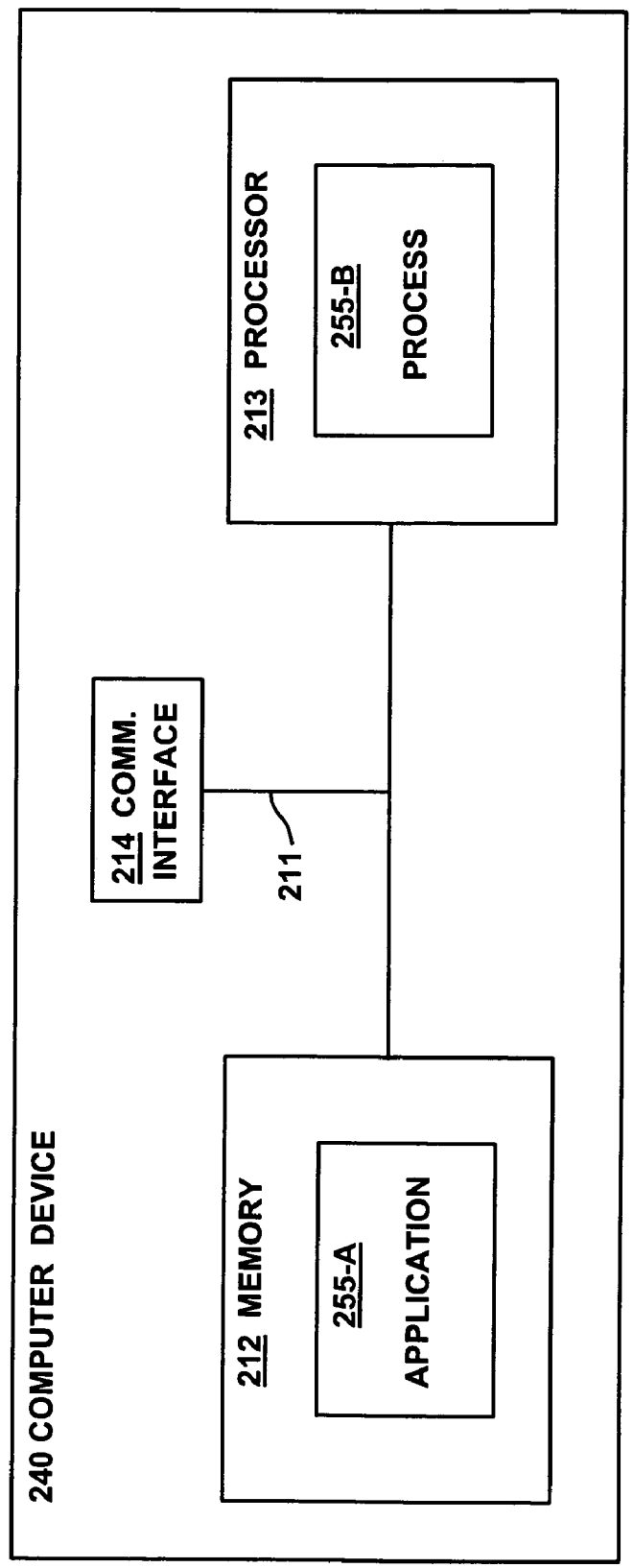
FIG. 4 illustrates an example architecture for a computer system that applies locale behaviors to a form in accordance with embodiments of the invention.

FIG. 4 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method in which at least one computer system accesses instructions from computer storage and executes the instructions to perform steps comprising:

identifying a form, the form having a form template and including at least one object;

assigning a locale property definition for the at least one object of the form;

storing the locale property definition within the form template; and rendering the form via a form rendering application supported in an environment providing an ambient locale property definition, wherein the at least one object of the form is rendered in accordance with the locale property definition object stored within the form template, wherein the form template includes a parent object hierarchically arranged with respect to a first child object and at least a second child object, the first child object positioned in a first area of the form template, the second child object positioned in a second area of the form template, wherein rendering the form template via the form rendering application includes:

detecting a first requirement that the first child object inherit the locale property definition utilized by the parent object;

detecting a second requirement that the second child object utilize the ambient locale property definition;

formatting content associated with the first child object according to the locale property definition utilized by the parent object; and formatting content associated with the second child object according to the ambient locale property definition, wherein detecting the first requirement that the first child object inherit the locale property definition utilized by the parent object includes:

determining an association between the parent object and the locale property definition needs to be created;

creating the association between the parent object and the locale property definition;

formatting content associated with parent object according to the locale property definition; and via a hierarchical relationship between the parent object and the first child object, passing the locale property definition to the first child object as the second child object formats content according to the ambient locale property definition.

2. The method of claim 1 wherein the assigning a locale property definition is done at runtime.

3. The method of claim 1 wherein the locale property definition is applied to at least one operation of an object, the at least one operation selected from the group comprising writing style, code page selection, data binding, picture formatting, default date formats, default time formats, converting data to another format and converting data from another format.

4. The method of claim 1 wherein the form is defined using an eXtensible Markup Language (XML) Forms Architecture (XFA), and wherein the XFA has an XML grammar for defining the locale property definition.

5. The method as in claim 1, wherein assigning a locale property definition for the at least one object of the form includes:
during runtime, creating an association between the object defined in the form template and one of: (i) the locale property definition stored within the form the local property definition associated with an area of the form template occupied by the object, and (ii) a default locale property definition associated with the entire form template.

6. The method as in claim 1, wherein creating the association between the parent object and the locale property definition occurs during runtime, the locale property definition representing at least one formatting standard associated with a country.

7. The method as in claim 1, wherein rendering the form includes:
applying a first locale property definition to content associated with a first form container; and
applying a second locale property definition to content associated with a second form container, both the first locale property definition and the second locale property definition stored within the form template.

8. The method as in claim 7, comprising:
wherein the first locale property definition is associated with a first geographical location; and
wherein the second locale property definition is associated with a second geographical location.

9. The method as in claim 1, wherein rendering the form includes:
applying a first locale property definition provided from within the form template to format content in hierarchically arranged objects located in a first subset of the form;
during runtime, receiving a second locale property definition from a source external to the form template; and
applying the second locale property definition to format content in the hierarchically arranged objects located in a second subset of the form.

10. The method as in claim 1, wherein identifying a form includes:
identifying a purchase order form compatible with receiving transaction data formatted according to a plurality of formatting standards from respective geographical locations.

11. A computer readable medium having computer readable code thereon for applying locale behaviors to a form, the medium comprising:
instructions for identifying a form, the form having a form template and including at least one object;
instructions for assigning a locale property definition for the at least one object of the form;
instructions for storing the locale property definition within the form template; and
instructions for rendering the form via a form rendering application supported in an environment providing an ambient locale property definition, wherein the at least one object of the form is rendered in accordance with the locale property definition stored within the form template,
wherein the form template includes a parent object hierarchically arranged with respect to a first child object and at least a second child object, the first child object positioned in a first area of the form template the second child object positioned in a second area of the form template
wherein instructions for rendering the form template via the form rendering application includes:
instructions for detecting a first requirement that the first child object inherit the locale property definition utilized by the parent object;
instructions for detecting a second requirement that the second child object utilize the ambient locale property definition;
instructions for formatting content associated with the first child object according to the locale property definition utilized by the parent object; and
instructions for formatting content associated with the second child object according to the ambient locale property definition,
wherein instructions for detecting the first requirement that the first child object inherit the locale property definition utilized by the parent object includes:
instructions for determining an association between the parent object and the locale property definition needs to be created;
instructions for creating the association between the parent object and the locale property definition;
instructions for formatting content associated with parent object according to the locale property definition; and
via a hierarchical relationship between the parent object and the first child object, instructions for passing the locale property definition to the first child object as the second child object formats content according to the ambient locale property definition.

12. The computer readable medium of claim 11 wherein the instructions for assigning a locale property definition are executed at runtime.

13. The computer readable medium of claim 11 wherein the instructions for assigning a locale property definition are applied to at least one operation of an object, the at least one operation selected from the group comprising writing style, code page selection, data binding, picture formatting, default date formats, default time formats, converting data to another format and converting data from another format.

14. The computer readable medium of claim 11 wherein the instructions further include instructions for defining a form using an eXtensible Markup Language (XML) Forms Architecture (XFA), and wherein the XFA has an XML grammar for defining the locale property definition.

15. A computer system comprising:
a memory;
a processor;
a communications interface;
an interconnection mechanism coupling the memory, the processor and the communications interface; and
wherein the memory is encoded with an application that when performed on the processor, provides a process for applying locale behaviors to a form, the process causing the computer system to perform the operations of:
identifying a form, the form having a form template and including at least one object;
assigning a locale property definition for the at least one object of the form;

storing the locale property definition within the form template; and rendering the form via a form rendering application supported in an environment providing an ambient locale property definition, wherein the at least one object of the form is rendered in accordance with the locale property definition stored within the form template, wherein the form template includes a parent object hierarchically arranged with respect to a first child object and at least a second child object, the first child object positioned in a first area of the form template the second child object positioned in a second area of the form template, wherein rendering the form template via the form rendering application includes:

detecting a first requirement that the first child object inherit the locale property definition utilized by the parent object;

detecting a second requirement that the second child object utilize the ambient locale property definition;

formatting content associated with the first child object according to the locale property definition utilized by the parent object; and formatting content associated with the second child object according to the ambient locale property definition, wherein detecting the first requirement that the first child object inherit the locale property definition utilized by the parent object includes:

determining an association between the parent object and the locale property definition needs to be created;

creating the association between the parent object and the locale property definition;

formatting content associated with parent object according to the locale property definition; and via a hierarchical relationship between the parent object and the first child object, passing the locale property definition to the first child object as the second child object formats content according to the ambient locale property definition.

16. The computer system of claim 15 wherein the assigning a locale property definition is done at runtime.

17. The computer system of claim 15 wherein the locale property definition is applied to at least one operation of an object, the at least one operation selected from the group comprising writing style, code page selection, data binding, picture formatting, default date formats, default time formats, converting data to another format and converting data from another format.

18. The computer system of claim 15 wherein the form is defined using an eXtensible Markup Language (XML) Forms Architecture (XFA), and wherein the XFA has an XML grammar for defining the locale property definition.

* * * * *

UNITED STATES PATENT AND TRADEMARK OFFICE
CERTIFICATE OF CORRECTION

PATENT NO. : 7,610,548 B1  Page 1 of 1
APPLICATION NO. : 11/250045
DATED : October 27, 2009
INVENTOR(S) : Brinkman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1049 days.

Signed and Sealed this

Twelfth Day of October, 2010

David J. Kappos
*Director of the United States Patent and Trademark Office*